May 13, 1947.  E. F. DYSON  2,420,527
RESILIENT ZERO STOP
Filed April 19, 1945
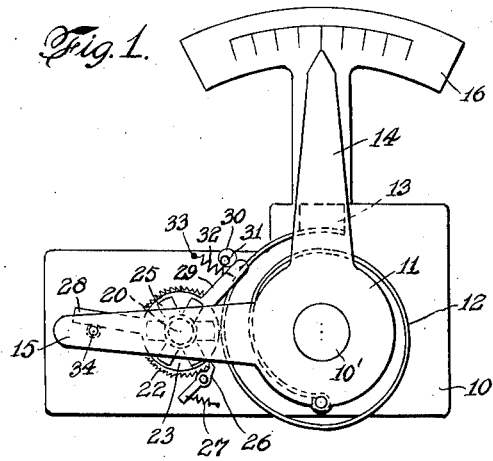
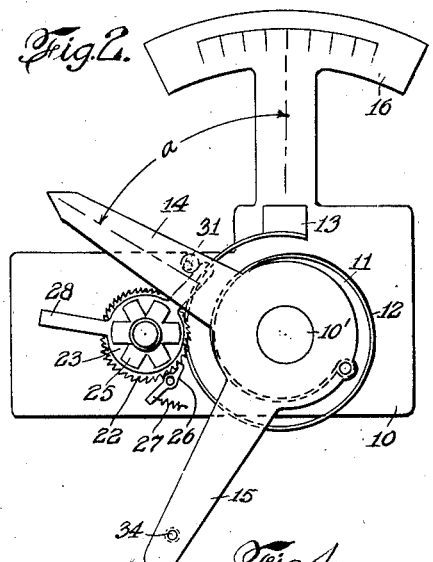
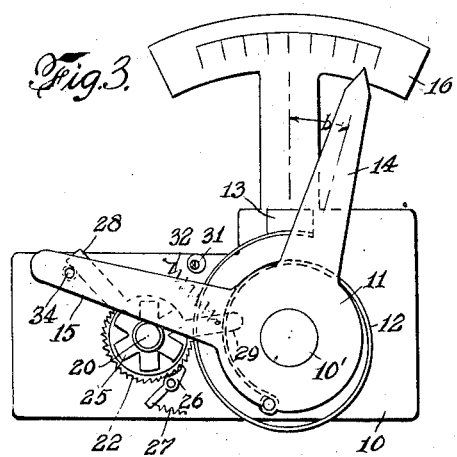
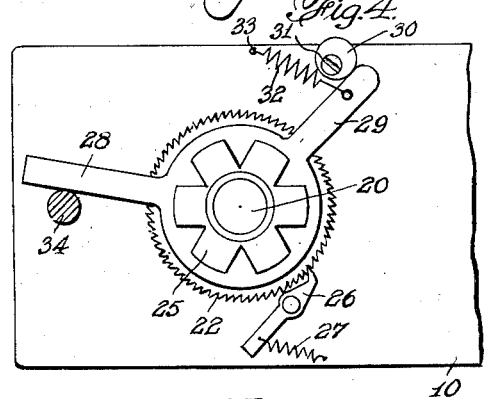
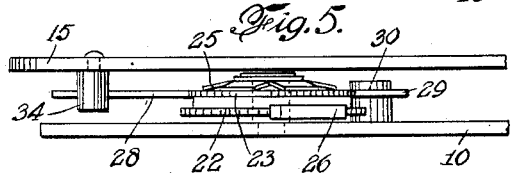
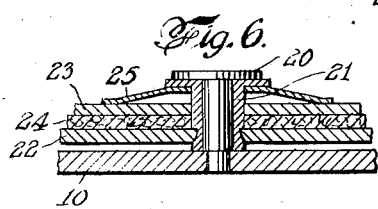
INVENTOR.
ERNEST F. DYSON
BY
ATTORNEY.

Patented May 13, 1947

2,420,527

UNITED STATES PATENT OFFICE 2,420,527

RESILIENT ZERO STOP

Ernest F. Dyson, Wolcott, Conn., assignor to The Bristol Company, Waterbury, Conn., a corporation of Connecticut Application April 19, 1945, Serial No. 589,157

10 Claims. (Cl. 116—129)

This invention relates to stops for resetting mechanisms as utilized in measuring or control instruments; and more especially to a stop means for quickly zeroing, or bringing to a position zero of reference, a displaceable spring-urged member such as a pointer, an index-impelling element, or a setting indicator of such measuring or control instrument.

A common type of index-impelling element in measuring instruments is a dog or impeller adapted to be progressively advanced away from a zero of reference in opposition to the influence of a spring or equivalent yielding force, and periodically to be released and allowed to assume its zero position under said influence. This type of element is found in demand meters, rate-of-flow meters, and telemetering instruments. Use of the element in the latter application is exemplified in U. S. Letters Patent No. 2,040,913 granted May 19, 1936, to applicant's assignee, wherein members of a differential gearing are progressively advanced against the force of a spring, and periodically released, to be reset each cycle by said spring to a fixed stop, forthwith to be re-engaged and again advanced until the releasing element comes into action. A further example is found in timing devices, wherein a graduated dial, or an index cooperating with such dial, is manually positioned at a predetermined time setting, and at the expiration of a corresponding interval is released and returned by means of a spring to a definite zero position.

In apparatus of the above class, it is desirable, and frequently imperative, that the displaceable element subject to resetting attain its zero position in a minimum of time, thus enabling each cycle of operation to be initiated without appreciable delay following the termination of the previous cycle. It will be apparent, however, that, because of the kinetic energy imparted to the moving part or displaceable element by the spring or other resetting influence, collision with an unyielding stop cannot but result in rebound. In consequence, either valuable time may be lost while delaying operations for the moving part to come to rest in engagement with the zero stop, or else the initiation of a second cycle may cause engagement of said moving part at any point within its range of rebound, thus introducing an element of uncertainty in the position attained at the instant of the succeeding release.

With a view to eliminating this undesirable characteristic of operation, there have been devised various expedients, some involving a yielding spring-urged stop, and others the deliberate introduction of a damping influence on the return of the moving member to its zero position. Experience has shown that the former principle alone is uncertain and erratic in performance, and under certain uncontrollable conditions may act to introduce a degree of rebound even greater than that which it is intended to eliminate, while the latter scheme is likely to be variable in operation, and to introduce sluggishness and uncertainty in attaining the final zero position.

It is an object of the present invention to provide means for absorbing the kinetic energy and the consequent rebound of a displaceable member subject to a resetting influence, without in any way interfering with its rapid attainment of a positive zero of reference.

It is a further object to provide a rebound-absorbing means which shall be equally effective and positive in its final positioning of the moving displaceable member, without respect to the extent of its previous deflection.

In carrying out the purposes of the invention, it is proposed to provide, for a member subject to a resetting influence, a yielding zero stop combining the properties of energy absorption and resiliency in such a manner that, while said member is allowed to overshoot its true zero position, its kinetic energy is rapidly absorbed by friction, and upon its coming to rest it is substantially instantaneously returned to said position.

The nature of the invention, however, will best be understood when described in connection with the accompanying drawings, in which:

Figs. 1, 2 and 3 are elevations of a mechanism embodying the principles of the invention, shown in a corresponding number of representative positions.

Figs. 4 and 5 are front and side elevations, respectively, of a detail of said mechanism, shown to an enlarged scale.

Fig. 6 is a fragmentary vertical section, to a further increased scale, taken on the line 6—6, Fig. 4.

Referring to the drawings, 10 designates a mounting plate having pivotally mounted thereon, as on a stud 10', a displaceable member 11 adapted to be rotated, in a plane parallel to the surface of said plate, in a clockwise sense as seen in the drawing, for example, by means of a spiral spring 12 which has one extremity fixed to an abutment 13 mounted on the plate 10 and the other extremity attached to the member 11.

While the member 11 may take any form consistent with the purposes of the apparatus of which it forms a part, it is for purposes of clarity here shown as a spider having two arms 14 and 15 and is adapted to be forcibly rotated or angularly displaced either manually or by mechanical means (not shown) in a counter-clockwise sense and in opposition to the influence of the resetting spring 12. For purposes of identification in setting forth the functioning of the device, the arm 14 of the member 11 is shown as terminating in a pointer or index which may cooperate, for example, with a graduated scale 16.

The resilient zero stop, associated with the member 11, wherein lies the present invention, will be best understood by reference to Figs. 4, 5 and 6 of the drawings. As indicated therein, there is pivotally mounted upon a pin or stud 20 secured to the mounting plate 10 a hub member 21 having an enlarged head portion, said hub having secured thereto, as by staking, a ratchet wheel 22, and also rotatably carrying a lever member 23. Interposed between said ratchet wheel and lever member is a flat washer member 24 formed of cork or similar material having a relatively high friction coefficient against the materials of said wheel and lever member. A spring washer 25 interposed between the head portion of the hub member 21 and the lever member 23 maintains in frictional engagement the assembly comprising said lever member, washer, and ratchet wheel, whereby any tendency toward relative rotation of the lever and ratchet will be opposed and may be effected only by the expenditure of energy. Pivotally mounted on the plate 10 is a pawl 26 adapted to be forced into engagement with the teeth of the ratchet 22 by means of a spring member 27, the relative disposition of said parts being such that, while the pawl offers no resistance to rotation of the ratchet wheel in a counter-clockwise sense, it will positively inhibit its rotation in the opposite direction.

The lever member 23 includes two integrally attached angularly disposed radial arms 28 and 29. Mounted upon the plate 10 is a stop member 30, which may be made adjustable by giving it the form of an eccentrically bored cylindrical block or post, secured to said plate by means of a screw 31. The stop 30 is interposed in the normal path of movement of the arm 29; and a spring member 32 extended between said arm and an abutment 33 on the mounting plate normally urges said arm into positive engagement with said stop.

Fixed to the arm 15 and projecting from its underface is a pin 34 adapted in the normal excursion of said arm to engage the other arm 28 of the lever member 23 in a sense that when the displaceable member 11 is urged to rotate in a clockwise sense under the influence of the spring 12, the said lever member 23 will be forced in the same direction, with a tendency to deflect in opposition to the influence of the spring 32, causing the arm 29 to be separated from the stop 30. The relative proportioning of spring strengths, lever-arm lengths, etc., is made such that the static force exerted by the arm 28 against the pin 34, due to the influence of the spring 32, will be greater than the static force due to the spring 12, whereby, under conditions of equilibrium, the arm 29 will be maintained in positive engagement with the stop 30, thereby determining the position of the arm 28 as engaged by the pin 34, and thus establishing a definite zero setting for the displaceable member 11, under which condition all parts would occupy the positions shown in Fig. 1 of the drawings.

For the purpose of explaining the operation of the device, it may be assumed that the displaceable member 11 has been forcibly deflected in a counter-clockwise sense from its normal zero position and in opposition to the influence of the spring 12 through an angle $a$, as indicated in Fig. 2. As hereinbefore pointed out, the manner of this deflection may be manual or mechanical, and forms no part of the present invention. The pin 34 of arm 15 of said member 11 will be correspondingly moved away from the arm 28; but the lever member 23, being constrained by the spring 32 with the arm 29 in engagement with the stop 30, will remain in its normal position. Upon release of the displaceable member 11, the spring 12 will at once impart to it rotary motion in a clockwise sense about its pivotal mounting 10', and, without restraint, it will move to its normal zero position, as indicated in Fig. 1; but, having acquired considerable velocity and a corresponding amount of kinetic energy, will cause the pin 34 to engage the arm 28 of the lever member 23 with a corresponding force and will tend to pass the zero position carrying said lever member along in a clockwise rotation about its pivotal mounting 20. Rotation as a unit of the assembly comprising the lever member 23 and the ratchet wheel 22 will, however, be prevented by engagement of the pawl 26 with the teeth of said ratchet wheel, so that the only rotation of the lever member 23 which can take place will be relative to the ratchet wheel.

Such relative rotation, however, will be inhibited by the frictional influence of the washer 24 interposed between said lever and ratchet and will as well be restrained by the spring 32 as it becomes increasingly extended by the rotation of the said lever member 23. This latter member will thus be deflected in a clockwise sense until all the kinetic energy possessed by the rapidly moving member 11 at the instant of engagement with the arm 28 has been absorbed, when the elements of the mechanism will momentarily come to rest in a position as indicated in Fig. 3, with the member 11 deflected in a clockwise sense through an angle $b$ beyond its normal zero position, and the lever member 23 correspondingly rotated in the same direction. As soon as the displaceable member 11 is brought to rest by the combined influence of the spring 32 and the absorption of energy in the frictionally engaging surfaces, the former acts to return said displaceable member to its normal zero position as indicated in Fig. 1. The pawl 26 offering no opposition to rotation of the ratchet wheel 22 in a counterclockwise sense, the assembly comprising said ratchet wheel, the lever 23 and the interposed washer 24, all carried by the hub 21, will rotate as a unit on the pin 20 and allow the mechanism to be returned freely and without restraint to its zero position, as determined by the re-engagement of the arm 29 with the stop 30, while the pin 34 of arm 15 remains in engagement with the arm 28.

By suitable adjustment, the relative spring strengths can be made such that a predominating part of the kinetic energy of the displaceable member 11 will be dissipated in friction on the surfaces of the washer 24, and only sufficient of said energy imparted to the spring 32 to enable the latter to return the said member 11 through the angle $b$ to its normal zero position, Fig. 1.

While the inertia of the moving parts in returning through the small angle $b$ to the zero position is normally small as compared to that of said parts on the original swing, yet it is (in theory at least) conceivable that there may be a slight counter-clockwise rebound beyond the zero position. In the event of such occurrence, it will be obvious that the resetting action will be repeated until the displaceable member 11 ultimately comes to rest at its true zero; and, in any event, the total time required for that condition to be attained will be materially less than were the zero stop to be either rigid or resilient, without the feature of energy absorption as the zero position is approached.

I claim:

1. Zeroing means for an angularly displaceable member including a resilient means to resist said member, comprising angularly movable stop means, spring-urged to a predetermined angular position with a force greater than the static force exerted by the resetting means, and adaptable to engagement by said displaceable member; and means frictionally retarding a relative displacement of the said angularly movable stop means only when displaced in the same sense as the effect of the resetting means.

2. Zeroing means for an angularly displaceable member including a resilient means to resist said member, comprising angularly movable stop means adaptable to engagement by said displaceable member, a fixed stop adapted for engagement by said movable stop means, spring means normally maintaining said angularly movable stop means and said fixed stop in mutual engagement with a force greater than the static force exerted by the resetting means, and means frictionally retarding displacement of the said angularly movable stop means in one direction only.

3. Zeroing means for angularly displaceable member including a resilient means to resist said member, comprising a stop member rotatable in a plane parallel to the plane of angular displacement of the displaceable member and disposed adjacently thereto for engagement therewith, fixed stop means and resilient means for maintaining temporarily said engagement, and frictional means for retarding angular movement of the rotatable stop member in one direction only.

4. Zeroing means for an angularly displaceable member including a resilient means to resist said member, comprising angularly movable stop means adaptable to engagement by said displaceable member, a fixed stop adapted for engagement by said movable stop means, spring means normally maintaining said angularly movable stop means and said fixed stop in mutual engagement with a force greater than the static force exerted by the resetting means, means frictionally retarding displacement of the said angularly movable stop means in one direction only, and release means cooperating with the frictional retarding means to render its effect unilateral.

5. Zeroing means for an angularly displaceable member including a resilient means to resist said member, comprising angularly movable stop means adaptable to engagement by said displaceable member, a fixed stop adapted for engagement by said movable stop means, spring means normally maintaining said angularly movable stop means and said fixed stop in mutual engagement with a force greater than the static force exerted by the resetting means, means frictionally retarding displacement of the said angularly movable stop in one direction only, and pawl and ratchet means cooperating with the friction retarding means to render it effective in only one direction of displacement of the movable stop means.

6. A device as claimed in claim 2, wherein the movable stop means includes two radial arms, one adapted for engagement with the fixed stop and the other for engagement with the angularly displaceable member.

7. A device as claimed in claim 2, wherein the movable stop means includes two radial arms, one adapted for engagement with the fixed stop and the other for engagement with the angularly displaceable member, and the means for normally maintaining said one arm of the movable stop means in engagement with the fixed stop is a tension spring attached at one end to said one arm.

8. A device as claimed in claim 2, wherein the movable stop means includes two radial arms, one adapted for engagement with the fixed stop and the other for engagement with the angularly displaceable member, and the means for normally maintaining said one arm of the movable stop means in engagement with the fixed stop is a tension spring attached at one end to said one arm and at the other end to an adjustable support whereby to adjust the strength of pull on said one arm.

9. A device as claimed in claim 5, wherein the frictional retarding means is a disk with opposite friction surfaces and interposed between the angularly movable stop means and a ratchet wheel of the pawl and ratchet means, and a spring washer bears upon the movable stop means to maintain the frictional engagement.

10. Zeroing means for measuring instruments, comprising a mounting plate; a displaceable member supported thereon for angular deflection in a plane parallel to the plate, together with a spiral spring connected between said plate and displaceable member to reset the latter, and the said member having two radially extending arms, one serving as an index; zeroing mechanism supported on said mounting plate adjacently the displaceable member over which the other arm of said displaceable member is adapted to extend and provided with a contact extension upon its under face, the said zeroing mechanism including a rotatably mounted disk having a pair of radially extending arms; a fixed stop element supported on the mounting plate adapted for engagement by one of the disk arms, the other of which is adapted for contact with the said contact extension; resilient means connecting said former arm of the disk with the mounting plate to maintain normally the contact between said latter arm and the fixed stop, a ratchet wheel coaxial with the disk and relatively rotatable thereto, a friction disk interposed between the rotatable disk and ratchet wheel, together with a spring washer to maintain the frictional engagement of the assembly, and a pawl supported on the mounting plate and spring-urged into contact with the teeth of the ratchet wheel to restrain rotation thereof in the direction of reset of the spiral spring controlling the displaceable member.

ERNEST F. DYSON.